United States Patent [19]

Clair

[11] Patent Number: 5,227,683
[45] Date of Patent: Jul. 13, 1993

[54] MAGNET ASSEMBLY WITH CONCENTRATOR FOR PROVIDING FLUX LINES PERPENDICULAR TO FLUID FLOW DIRECTION WITHIN STEEL PIPE

[76] Inventor: Colonel Clair, P.O. Box 94321, Las Vegas, Nev. 89199

[21] Appl. No.: 833,734

[22] Filed: Feb. 11, 1992

[51] Int. Cl.⁵ .................. G21D 7/02; H02K 44/00
[52] U.S. Cl. .................................... 310/11; 210/222
[58] Field of Search ........................ 310/11; 210/222

[56] References Cited

U.S. PATENT DOCUMENTS

| | | | |
|---|---|---|---|
| 2,652,925 | 9/1953 | Vermeiren | 210/1.5 |
| 3,127,528 | 3/1964 | Lary et al. | 310/11 |
| 3,349,354 | 10/1967 | Miyata | 335/209 |
| 3,480,145 | 11/1969 | Gladden | 210/223 |
| 3,567,026 | 3/1971 | Kolm | 210/222 |
| 3,608,718 | 9/1971 | Aubrey, Jr. et al. | 209/214 |
| 3,807,903 | 4/1974 | Gelfgat et al. | 310/11 X |
| 4,151,423 | 4/1979 | Hendel | 310/11 X |
| 4,210,535 | 7/1980 | Risk | 210/222 |
| 4,265,746 | 5/1981 | Zimmerman, Sr. et al. | 210/695 |
| 4,265,754 | 5/1981 | Menold | 210/222 |
| 4,265,755 | 5/1981 | Zimmerman | 210/222 |
| 4,430,588 | 2/1984 | Way et al. | 310/11 |
| 4,486,701 | 12/1984 | Cover | 310/11 X |
| 4,687,418 | 8/1987 | Gotou et al. | 310/11 X |
| 4,711,271 | 12/1987 | Weisenbarger et al. | 210/222 X |
| 4,749,890 | 6/1988 | Houston | 310/11 |
| 4,767,953 | 8/1988 | Furuya et al. | 310/11 |
| 4,818,185 | 4/1989 | Alexeff | 310/11 X |
| 4,946,590 | 8/1990 | Hertzog | 210/222 |
| 4,956,084 | 9/1990 | Stevens | 210/222 |
| 5,124,045 | 6/1992 | Janczak et al. | 210/222 X |

FOREIGN PATENT DOCUMENTS

| | | |
|---|---|---|
| 8102529 | 9/1981 | PCT Int'l Appl. |
| 8903808 | 5/1989 | PCT Int'l Appl. ........... 210/222 |
| 9105971 | 5/1991 | PCT Int'l Appl. ........... 210/222 |

Primary Examiner—Steven L. Stephan
Assistant Examiner—Ed To
Attorney, Agent, or Firm—David Pressman

[57] ABSTRACT

A permanent magnet fluid generator with powerful magnetic field condensers. The condensers utilize neodymium magnets (2) which provide 12,000 gauss or greater to magnetically saturate steel pole pieces (1, 3.) The condensers' pole pieces are individually designed to magnetically oversaturate all commercial steel pipe walls (6) in all current diameters and thicknesses (e.g., ANSI, ASME, API, schedule #40, etc.) The generator drives flux lines completely through a commercial steel pipe wall (9) perpendicular to the flow of any fluid flowing inside the pipe. The fluid thereby generates an electrical current in the fluid that can be utilized to protect the pipe from scale and corrosion. The current can also be used to ionize molecules in the fluid or the substances dissolved or suspended in the fluid, producing many benefits, such as more suds, in hard water, inhibiting algae in water systems, improving irrigation water penetration, accelerating the clearing of effluent waters, and improving the combustion of hydrocarbon fuels.

20 Claims, 1 Drawing Sheet

U.S. Patent
July 13, 1993
5,227,683
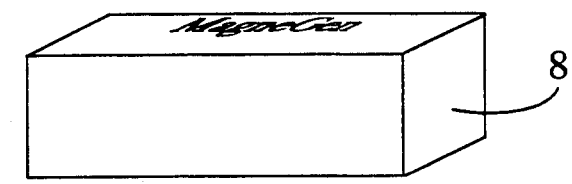
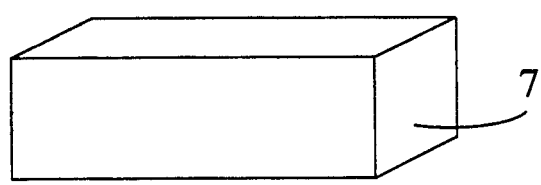
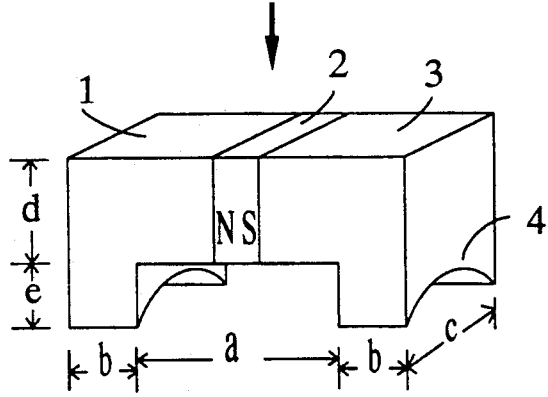
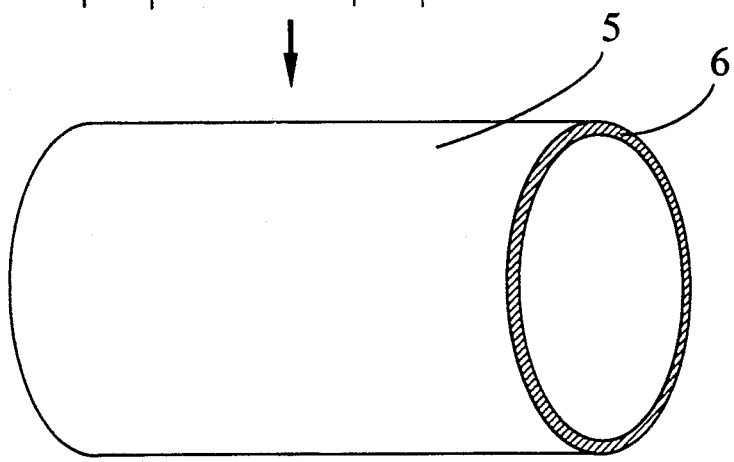
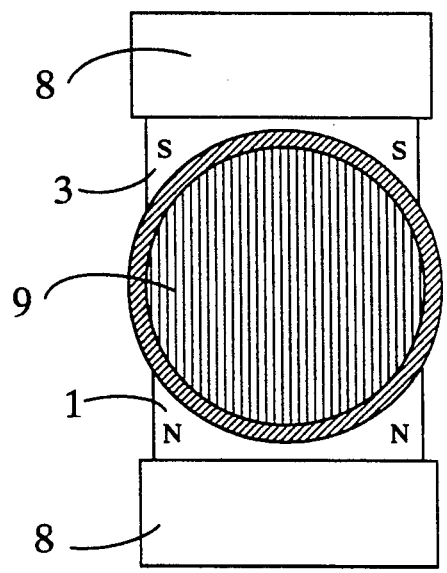
Fig 1
Fig 2

MAGNET ASSEMBLY WITH CONCENTRATOR FOR PROVIDING FLUX LINES PERPENDICULAR TO FLUID FLOW DIRECTION WITHIN STEEL PIPE

BACKGROUND —FIELD OF INVENTION

This invention relates to treatment of fluid in pipes to prevent corrosion, etc., specifically to a device employing externally mounted permanent magnets that generate an electrical current in fluid. The device may be used for potable fluids, process fluids, effluent fluids, heating and cooling waters, and hydrocarbon fuels, flowing in all commercial steel pipe.

BACKGROUND—DESCRIPTION OF PRIOR ART

Commercial steel pipe walls (normally of the types known as ANSI, ASME or API, schedule #40, etc.,) are too thick to be penetrated by the fields from usual permanent magnets such as to provide an internal field perpendicular to the flow direction of the fluid inside the pipe.

While it may be theoretically possible to redesign existing permanent magnet devices to accomplish this task, any such attempts would fail or result in products of preposterous dimensions and cost.

In other words, no existing devices are designed, or claim to be designed, to drive magnetic flux through a commercial steel pipe wall.

Also none are designed, or claim to be designed, to drive magnetic flux through a commercial steel pipe wall, perpendicular to the flow direction of the fluid inside.

Further none are designed, or claim to be designed, to drive magnetic flux through a commercial steel pipe wall, perpendicular to the flow direction of the fluid, inside, for the purpose of generating an electrical current in the fluid.

Finally none, according to their published designs, materials, dimensional specifications, are capable of driving magnetic flux through commercial steel pipe walls, perpendicular to the flow direction of the fluid inside.

To generate an electrical current by means of fluid flowing in a pipe, which fluid cuts a magnetic field, the magnetic field must be perpendicular to the direction of fluid flow. Placing magnets through or inside a steel pipe for this purpose is impractical, expensive, and loses the advantages of maintaining the steel pipe wall in its strong state. Similarly, placing magnets on the outside of nonferrous pipes loses the advantage of the strong steel pipes. No existing permanent magnet devices can provide a practical means of penetrating commercial steel pipe water or fuel systems with a perpendicular magnetic field.

The wall of a steel commercial pipe easily absorbs magnetic flux. If any magnetic fields of existing devices could penetrate the pipe wall, such fields would quickly curve back to the wall, parallel to the fluid flow.

PRESENT INVENTION

The instant device magnetically penetrates all commercial steel pipe walls by means of its magnetic concentrators or condensers which utilize new magnetic materials and also benefit from an innovative, but simple, design, essential to their operation. The present device uses simple, innovative elements which have not heretofore been employed.

The magnet utilized in the present device employs neodymium, the strongest magnetic material commercially available. It provides a flux density of 12,000 gauss, or higher. This provides sufficient magnetic flux for the condenser pole pieces to be designed in a practical way so that their steel contacts can be saturated with the maximum magnetic flux that the steel in the poles and the pipe wall can carry. The pole piece's contacts are made to be three times the thickness of the pipe wall. This enables the condenser pole pieces to deliver three times the lines of magnetic flux that the pipe wall can carry. The surplus flux lines burst through the pipe wall, in their attempt to flow through it, to the other pole to complete the magnetic circuit.

The device employs two condenser pole pieces. The other pole of the first condenser is further away than the distance across the inside of the pipe. This places the second and opposite condenser's opposing pole closer to the surplus lines of flux than the first condenser's opposite pole. The surplus magnetic flux takes the shortest path across the inside of the pipe to the opposite condenser. This creates a magnetic field inside the pipe. This magnetic field is perpendicular to the direction of flow of fluid inside the pipe. The flowing fluid is thereby forced to cut the magnetic lines of force, perpendicular, to the direction of flow. This generates an electrical current, in the fluid, according to the well established Faraday Effect.

The device generates an electrical current in a flowing fluid or gas. During generation, the steel pipe becomes negative and a "field" or "stator" of a generator. The flowing fluid or gas becomes a positive "armature" or "rotor".

OBJECTS AND ADVANTAGES

The objects and advantages of the invention are therefore:

1. to provide direct power generation from a flowing fluid or gas,
2. to protect steel and all other pipe systems from scale, corrosion and algae,
3. to afford cathodic protection to all metal pipe systems, and
4. to ionize molecules, in all fluids flowing in all pipe systems.

Combinations of the above processes afford the following:

(a) increased oxygen availability in water,
(b) reduced surface tension, of water,
(c) increased sudsing, in hard water,
(d) increased solubility of water and other fluids; i.e., better dissolving and rinsing,
(e) reduced bacteria and algae replication in water, fuels and other fluids,
(f) increased precipitation and/or flotation of suspended solids in fluids,
(g) compression of dissolved solids in fluids,
(h) accelerated organic reactions in water and other fluids,
(i) reduced biochemical oxygen demabd in effluent waters,
(j) reduced suspended solids, in effluent waters,
(k) accelerated and completed chlorine reactions in water sanitation,
(l) elimination of commercial water treatment chemical pollution, (m) elimination of salt water softener pollution,
(n) increased soil penetration by irrigation water,
(o) increaded plant growth and crop yield,
(p) increaded efficiencies of metals ore leeching processes,
(q) increased heat-transfer efficiencies in heating and cooling,
(r) great reduction in cooling tower water bleed-off,
(s) increased hydrocarbon fuel combustion efficiency,
(t) increased hydrocarbon fuel injector life,
(u) reduced pollution from hydrocarbon fuels combustion,
(v) combined combustion of water and hydrocarbon fuel mixtures, and
(w) possible combustion of water as a primary fuel component.

Other objects are the nonchemical clearing of algae from pools, fountains, lakes, and waterways; the annual saving of billions of dollars spent on commercial water treatment chemicals, including commercial and domestic salt water softening, the elimination of their collective pollution; the annual saving of uncountable trillions of gallons of potable water, polluted by cooling towers and boilers, and the billions of dollars in annual savings from the elimination of their pollution; a very significant reduction of energy requirements from increased combustion, heating and cooling efficiencies; a tremendous reduction in air and water pollution; increased mining mineral yields; increased food production and quality; many more savings associated with, or as the result of, all of the above and the resulting improved quality of life to the ultimate advantage to all.

Many more objects and advantages will become apparent from the following description and drawings.

DRAWING FIGURES

In the drawings, all parts are numbered and all dimensions are lettered.

FIG. 1 shows the parts of a magnetic condenser according to the inventions in the order they fit together and how the finished unit fits onto a pipe.

FIG. 2 shows an end view of two condensers installed on a cutaway section of a pipe and a representation of the resulting lines of magnetic flux that are perpendicular to the fluid flow direction.

REFERENCE NUMERALS

1. North pole piece
2. Magnet
3. South pole piece
4. Pole with radius according to the pipe OD
5. Pipe
6. Pipe wall thickness.
7. Inner cover
8. Outer cover
9. Lines of magnetic flux perpendicular to the pipe wall
a. Distance between pole contacts
b. Width of pole contacts
c. Length of condenser

DESCRIPTION—FIGS. 1 AND 2

A device according to the invention is shown in FIG. 1 and employs two identical condenser pole pieces 1 and 3 on opposite sides of a neodymium magnet 2, oriented as shown, providing 12,000 gauss. Condenser pole pieces 1 and 3 are machined from hot-drawn, low carbon steel and have an L-shaped configuration as indicated, with one end of the "L" being flat and abutted against one face of magnet 2 and the other end being curved as indicated to mate with the outside of pipe 5.

A inner cover 7 and an outer cover 8 are stamped and folded from medium-carbon sheet steel. The outer cover is protected with a powder coating (not shown) and nests upon the inner cover, which in turn nests upon the pole assembly, all, without making contact. An even space between them is maintained with a high tensile strength epoxy resin (not shown).

Two completed devices are placed opposite each other on the pipe to form the assembly shown in FIG. 2. One device's pole pieces oppose the other's. No clamps or other appliances are required. The devices are so powerful that they secure themselves to the pipe. The size of the devices is determined by the inside and outside diameters and wall thickness of the pipe. The optimal magnet thickness is 1". Dimension "a" is 1.25 times the inside diameter (ID) of the pipe. Dimension "b" is 3 times the thickness of the pipe wall. Dimension "c" is equal to the ID of the pipe. Dimension "d" is 1.5 times, b. Dimension "e" is 1.5 times the height of radius 4.

OPERATION—FIGS. 1 & 2

The operation is quite simple. Two devices, sized according to the above description, are placed on cleaned sections of a steel pipe, directly opposite each other. The north pole of one device opposes the south pole of the other. A very dense magnetic field then flows from each device's north pole, through the pipe's inside wall, and across the inside space of the pipe, to the opposite device's south pole. This completes their magnetic circuits. Any fluid flowing in the pipe will cut the magnetic field which is perpendicular to the fluid's direction of flow. As the fluid cuts the magnetic field's lines of force, an electric current is generated in the fluid. (The current could theoretically, be taken off the charged fluid by means of insulated electrodes through the pipe wall.)

The device's immediate operation and application is in allowing the current to be used in ionizing the molecules of fluid and solids, dissolved and/or suspended in the fluid. The resulting ionization is far more than adequate to prevent scale and corrosion, if installed on the inlet pipes to heat exchange equipment to be protected, such as a cooling tower return line and a chiller condenser inlet in an air conditioning system. The device is also very effective in protecting boilers and heat exchangers, from scale and corrosion, if installed at their main feed water inlets. The device can also effectively replace salt water softening by providing hard water sudsing and rinsing.

The resulting ionization also is very effective in increasing the combustion efficiency of hydrocarbon fuels by affording a more complete molecular mixing of the fuel and air molecules.

SUMMARY, RAMIFICATIONS AND SCOPE

Additional applications and operations of the device are possible.

In all cases the operation is essentially the same: the device is simply installed on the steel pipe carrying the fluid to be ionized.

All water, fuel, and gas systems will benefit, from the device's ability to drive magnetic flux, through domestic, commercial and industrial steel pipe systems. It protects the pipes by holding them negative and ionizing the molecules of the flowing fluids and gases inside.

The scope of the invention should not be limited to the examples given, but should be determined from the claims and their equivalents.

I claim:

1. A permanent magnet assembly for treating a fluid flowing inside a pipe having a pipe wall of predetermined dimensions, comprising:

a pair of magnetic devices, each device comprising:

a permanent magnet having two oppositely facing surfaces with opposite poles at said respective opposite surfaces, a pair of pole pieces, each pole piece comprising a generally L-shaped member, each pole piece having a proximal end and a distal end opposite to said proximal end, said proximal end of one of said pole pieces abutting one of said oppositely facing surfaces of said permanent magnet, said distal end of said one pole piece being a curved surface which conformingly mates with the outside surface of a pipe of predetermined dimensions, said proximal end of the other of said pole pieces abutting the other of said oppositely facing surfaces of said permanent magnet, said distal end of said other pole piece being a curved surface which conformingly mates with said outside surface of said pipe, said pair of magnetic devices each being shaped and sized so that when each device is assembled with said magnet sandwiched between said pole pieces with said proximal ends of said pole pieces abutting said respective oppositely facing surfaces of said magnet, said devices can be placed on opposite sides of said pipe at corresponding positions, with said distal ends of said pole pieces of each device longitudinally spaced along said pipe, with opposite poles of said respective devices facing each other, a magnetic field will extend between each pair of said facing opposite poles, across said pipe and transversely to the direction of fluid flow therein so that said fluid, flowing inside said pipe will cut said flux lines to generate an electrical current in said fluid so as to reduce scaling, corrosion, and algae buildup in said pipe.

2. The assembly of claim 1 wherein said permanent magnet of each of said magnetic devices produces a flux density of about 12,000 gauss.

3. The assembly of claim 1 wherein the cross-sectional area of each of said distal ends of each of said pole pieces is smaller than said oppositely facing surfaces of said permanent magnet, whereby said pole pieces will condense the magnetic fields of said magnets, thereby magnetically saturating said pole pieces and subsequently oversaturating said pipe wall, driving magnetic flux through said pipe wall.

4. The assembly of claim 3 wherein the cross-sectional area of each of said distal ends of each of said pole pieces is approximately 1.5 times smaller than said oppositely facing surfaces of said permanent magnet, whereby said pole pieces will condense the magnetic fields of said magnets.

5. The assembly of claim 1 wherein the thickness of said permanent magnets and the lengths of said pole pieces is such that the spacing between said distal ends of said pole pieces is larger than the inside diameter of said pipe.

6. The assembly of claim 5 wherein the thickness of said permanent magnets and the lengths of said pole pieces is such that the spacing between said distal ends of said pole pieces is approximately 1.25 times larger than the inside diameter of said pipe.

7. The assembly of claim 1 wherein said distal end of each of said pole pieces has a thickness, measured in the longitudinal direction of said pipe, greater than the thickness of the wall of said pipe.

8. The assembly of claim 7 wherein said distal end of each of said pole pieces has a thickness, measured in the longitudinal direction of said pipe, approximately three times greater than the thickness of the wall of said pipe.

9. The assembly of claim 1, further including said pipe, said pipe having said predetermined dimensions.

10. The assembly of claim 9 wherein said pipe is made of steel.

11. The assembly of claim 1 wherein (a) said permanent magnet of each of said magnetic devices produces a flux density of about 12,000 gauss, and wherein (b) the cross-sectional area of each of said distal ends of each of said pole pieces is smaller than said oppositely facing surfaces of said permanent magnet, whereby said pole pieces will condense the magnetic fields of said magnets, thereby magnetically saturating said pole pieces and subsequently oversaturating said pipe wall, driving magnetic flux through said pipe wall.

12. The assembly of claim 11 wherein the cross-sectional area of each of said distal ends of each of said pole pieces is approximately 1.5 times smaller than said oppositely facing surfaces of said permanent magnet, whereby said pole pieces will condense the magnetic fields of said magnets.

13. The assembly of claim 1 wherein (a) the thickness of said permanent magnets and the lengths of said pole pieces is such that the spacing between said distal ends of said pole pieces is larger than the inside diameter of said pipe and wherein (b) said distal end of each of said pole pieces has a thickness, measured in the longitudinal direction of said pipe, greater than the thickness of the wall of said pipe.

14. The assembly of claim 13 wherein said distal end of each of said pole pieces has a thickness, measured in the longitudinal direction of said pipe, approximately three times greater than the thickness of the wall of said pipe.

15. The assembly of claim 14, further including said pipe, said pipe having said predetermined dimensions.

16. The assembly of claim 15 wherein said pipe is made of steel.

17. The assembly of claim 16 wherein said permanent magnet of each of said magnetic devices produces a flux density of about 12,000 gauss.

18. The assembly of claim 1 wherein (a) the cross-sectional area of each of said distal ends of each of said pole pieces is smaller than said oppositely facing surfaces of said permanent magnet, whereby said pole pieces will condense the magnetic fields of said magnets, thereby magnetically saturating said pole pieces and subsequently oversaturating said pipe wall, driving magnetic flux through said pipe wall, and wherein (b) the thickness of said permanent magnets and the lengths of said pole pieces is such that the spacing between said distal ends of said pole pieces is larger than the inside diameter of said pipe.

19. The assembly of claim 18 wherein said distal end of each of said pole pieces has a thickness, measured in the longitudinal direction of said pipe, greater than the thickness of the wall of said pipe.

20. The assembly of claim 19, further including said pipe, said pipe having said predetermined dimensions.

* * * * *